(12) United States Patent
Martínez Valdegrama et al.

(10) Patent No.: US 8,375,978 B2
(45) Date of Patent: Feb. 19, 2013

(54) FASTENING SYSTEM FOR DRAINAGE VALVES

(75) Inventors: Vicente Martínez Valdegrama, Alpedrete (ES); Luis Manuel Rodríguez Urbina, Leganés (ES); Olaf Andreas Dietrich Carreño, Madrid (ES)

(73) Assignee: Airbus Operations, S.L., Madrid (ES)

( * ) Notice: Subject to any disclaimer, the term of this patent is extended or adjusted under 35 U.S.C. 154(b) by 328 days.

(21) Appl. No.: 12/712,312

(22) Filed: Feb. 25, 2010

(65) Prior Publication Data

US 2010/0219365 A1    Sep. 2, 2010

(30) Foreign Application Priority Data

Feb. 26, 2009    (ES) .................................. 200900531

(51) Int. Cl.
*F16K 1/42*    (2006.01)
(52) U.S. Cl. .................... 137/315.01; 251/359
(58) Field of Classification Search ............. 137/315.01; 251/359
See application file for complete search history.

(56) References Cited

U.S. PATENT DOCUMENTS

| | | | | |
|---|---|---|---|---|
| 4,630,168 A | * | 12/1986 | Hunt | 361/218 |
| 5,375,813 A | * | 12/1994 | Rozinsky | 251/360 |
| 7,097,131 B2 | * | 8/2006 | Palmer et al. | 244/1 A |

* cited by examiner

*Primary Examiner* — Kevin Lee
(74) *Attorney, Agent, or Firm* — Jenkins, Wilson, Taylor & Hunt, P.A.

(57) ABSTRACT

Provided herein are drainage valves for removing water accumulated in the lower part of fuel tanks of an aircraft. The valves can be affixed in correspondence with a lower skin forming part of the tanks. The lower skin includes recesses for the complementary housing of the heads of the valves that, in combination with some axial fastening nuts, immobilize the valves to that skin. The recesses can comprise a conical structure obtained by deformation of the lower skin, and with the deformation an inner elevated seat is further obtained, on which seat the axial fastening nuts press, maintaining the thickness of the skin in the area where the valves are located, thus preventing the area from weakening as it happens conventionally.

5 Claims, 3 Drawing Sheets

FASTENING SYSTEM FOR DRAINAGE VALVES

OBJECT OF THE INVENTION

As stated in the title of this descriptive specification, the present invention relates to a fastening system for drainage valves, which have the purpose of removing the water accumulated in the lower part of fuel tanks of an aircraft.

So, the object of the invention is to increase the quality of the fastening of the drainage valves, which also entails a considerable saving in recurrent manufacturing costs.

BACKGROUND OF THE INVENTION

The fuel tanks of aircraft located in wings and horizontal stabilizer (HTP) are fitted with several drainage valves with the purpose of removing the water accumulated in the lower part of those tanks, in such a way that the valves are fitted in the lower skins and also in the manhole covers for the case of a ventilation tank. These covers consist of some removable elements for being able to gain access to the inner space of the wings of the aircraft, wherein the wings constitute the actual fuel tanks.

The part of the valve in contact with the outside of the tank is arranged in the aerodynamic zone in order to prevent problems of parasitic resistance due to possible discontinuities of the surface.

Currently, in order to fit that drainage valve, a recess needs to be created with material that is pulled from the aerodynamic surface of the skin. This recess requires a manual machining with some very small tolerances, which leads to serious problems of quality as far as the finish is concerned, in addition to being a process that is slow and uncontrolled.

So, the said manual recessing for a traditional drainage valve for water is a slow process which does not guarantee the quality required for the later fitting of the valve. Moreover, the cylindrical structure of that recess weakens the lower skin.

DESCRIPTION OF THE INVENTION

With the aim of achieving the objectives and preventing the drawbacks mentioned in the above sections, the invention proposes a fastening system for drainage valves, which are fitted in correspondence with a lower skin of the wings of an aircraft for removing the water accumulated in the lower part of fuel tanks located inside the wings, which constitute the actual fuel tanks.

The valves in principle comprise a main body which has an external head arranged outside of the lower skin sitting on the outer face of that skin, in such a way that the main body of the valve fits into a passing-through hole made in that lower skin, and at the same time its immobilization is ensured by means of an annular fastening element, such as a nut for example, which sits and presses on the inner face of that skin at the same time the nut threads onto the main body of the valve.

Starting from this premise, the system of the invention is characterized in that, apart from being flush with the outer surface of the lower skin of the wing, the external head of the valve body also comprises a conical structure which is complemented with a cavity or recess, also of a conical structure, coaxially arranged with respect to the passing-through hole on the outside of the skin, with an elevated seat with a configuration of revolution that is also conical being defined around that passing-through hole but via the inner face of the lower skin, though it could have a seat with another and different configuration of revolution, at all times with an upper elevation with respect to the rest of the inner surface of the fuel tanks.

The conical cavity or recess could also present another and different configuration of revolution, simply by altering the straight generatrix of that conical cavity for a curved generatrix or a combination of both, and even a generatrix with various straight sections.

The system of the invention is furthermore complemented with a characteristic axial fastening nut coupled on the main body of the valve on the inside of the fuel tank, in such a way that, once tightened, that nut will press on a narrow annular zone of the internal revolution seat, favoring the radial tightening of the skin material against the valve body in order to achieve a more effective sealing of the fuel tank.

Another characteristic of the invention is that the contact surface for the axial fastening nut and narrow annular zone are complementary.

The lower skin comprises a carbon fiber structure, such that during the curing process or by means of later heating in the specific zone where the drainage valve is going to be installed, provision is made for a male element (conical piece) where that specific zone of the lower skin will be supported, with the outer conical cavity being generated as well as the inner seating with the same shape as the conical cavity, the thickness of said lower skin being maintained since said deformation can be regarded as being a funnel.

More specifically, the conical piece is located on a taped cradle of the carbon fiber structure, in such a way that strips of fabric of that carbon fiber structure will be taped on top of the said conical piece.

Therefore, the system of the invention does not just avoid having to create the recess by means of pulling material from the outer surface of the lower skin, thereby weakening it in the zone where the valve is going to be installed, but it also ensures a much better contact of the fastening nut on the inside, avoiding the need to make the inside of the lower skin flat as occurs traditionally.

Below, in order to facilitate a better understanding of this descriptive specification and forming an integral part thereof, some figures are attached in which the object of the invention has been represented by way of illustration and non-limiting.

DESCRIPTION OF THE PREFERRED FORM OF EMBODIMENT

Figure 1:
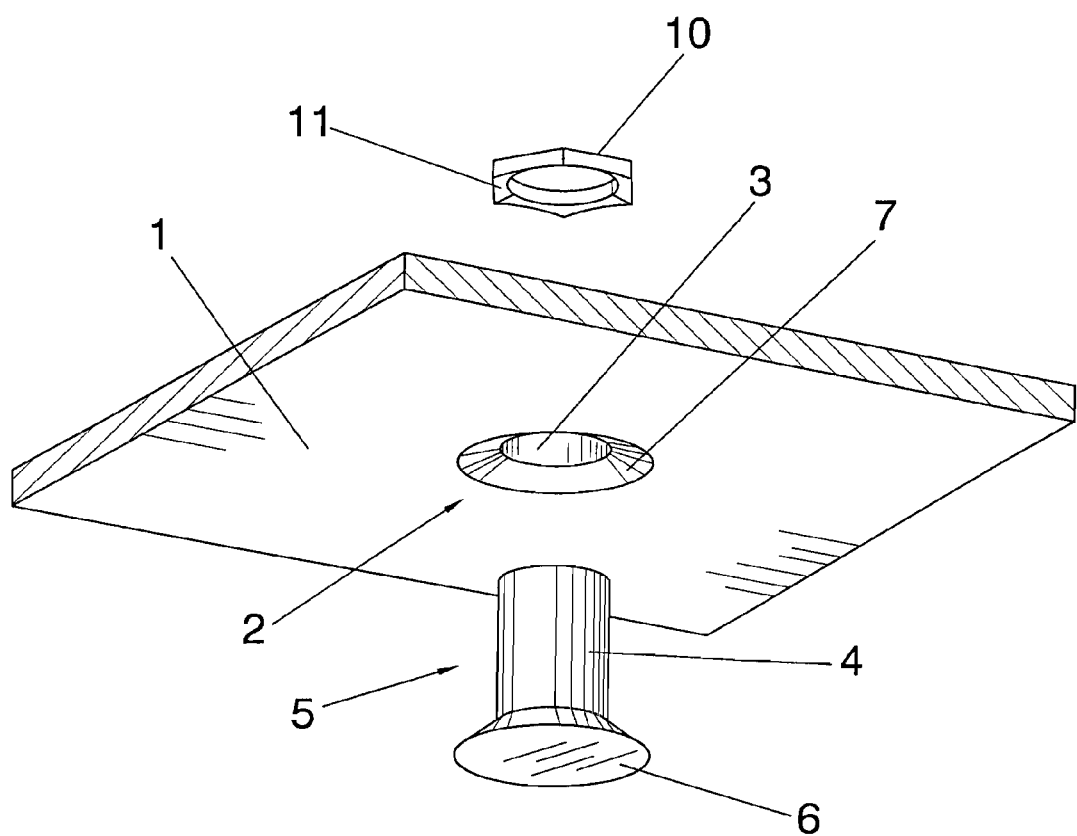
FIG. 1.—Shows an exploded perspective view of the fastening system for drainage valves, of the present invention.
Figure 2:
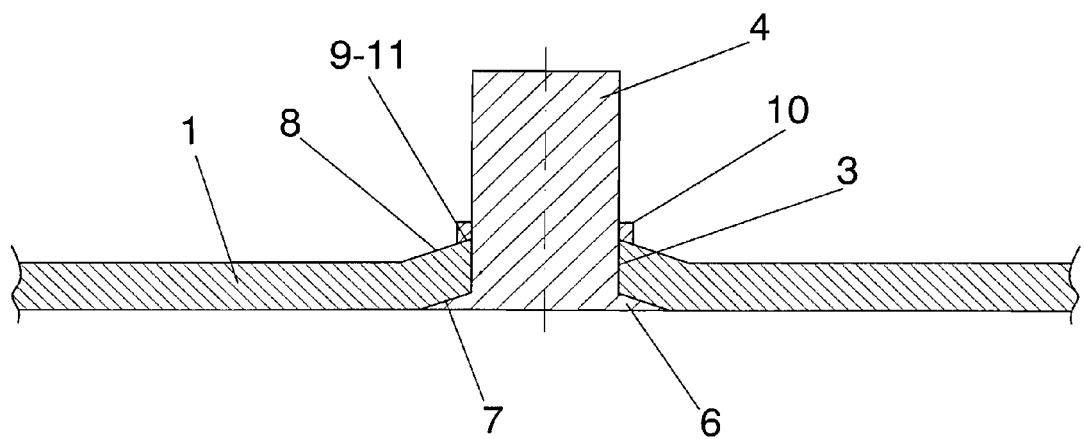
FIG. 2.—Shows a view in cross-section of the system of the invention.

Considering the numbering adopted in the figures, the fastening system for drainage valves is located in a lower skin 1 of the wings of an aircraft, which constitute an actual fuel tank, in such a way that the drainage valves will be installed in that lower skin, with the aim of removing the water that accumulates in the bottom of the fuel tanks.

The lower skin 1 comprises a carbon fiber structure including several conical funnels 2 arranged in correspondence with each passing-through holes 3 in each of which a cylindrical piece 4 of a main body 5 of the drainage valves is fitted, this main body also having a conical head 6 fitted in an outer complementary cavity or recess 7 coaxially arranged with respect to the respective passing-through hole 3, the recess 7 being generated as a consequence of the conical funnel 2.

In turn, the said funnel 2 also generates an inner conical seat 8, on whose innermost annular zone 9 presses an axial fastening and tightening nut 10 which threads into the main body 5 of the valve in order to immobilize the valve unit, achieving complete sealing of the system of the invention.

The lower face 11 of the fastening nut 10 that is in contact with the inner conical seat 8 presents the same inclination, with which a more effective pressure and fastening is achieved.

The concept of fastening of the drainage valve of the system of the invention enables the cavity or recess 7 to be created where the head 6 of the main body 5 of the drainage valve fits during the taping process of the skin containing the said drainage valve. With this change, the quality of the product is increased and savings on its recurrent manufacturing costs are achieved.

Figure 3:
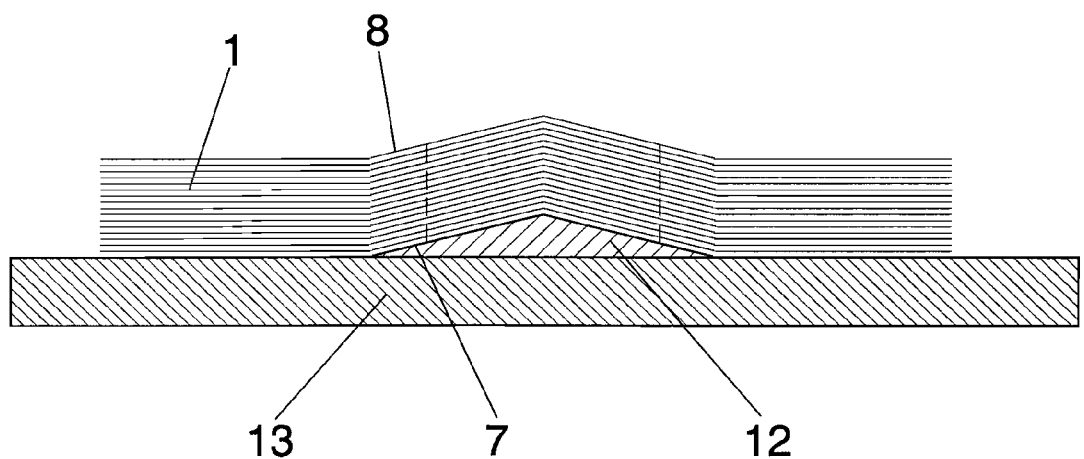
FIG. 3.—Shows a view in cross-section of an initial phase of the process for obtaining the system of the invention.

As clearly shown in FIG. 3, each one of the funnels 2 in the lower skin 1 is started and shaped by placing a conical piece 12 on a taped cradle 13 of the carbon fiber material shaping the lower skin 1, in such a way that the strips of fabric become taped on top of the conical piece 12.

Following the curing of the carbon fiber structure, each passing-through hole 3 where the main body 4 of each valve will be located is created.

So, the improvement that is produced from the point of view of the installation of the equipment is reflected in achieving the sealing (equipment-structure) without the need of installing a rubber gasket as currently occurs. Likewise, the actual conicity of the tightening nut 10 (nut that is conventionally flat) means that the fitting of the valve does not require any "flatness" in its inner surface, furthermore achieving a better tightening.

Moreover, the application of aerodynamic sealants is also avoided, which sometimes cause malfunctioning of the equipment or cause steps in the aerodynamic surfaces, as occurs conventionally.

The invention claimed is:

1. A fastening system for drainage valves, comprising:
   a carbon fiber lower skin of a fuel tank, comprising:
      a passing-through hole of the carbon fiber lower skin;
      a conical cavity on an outer surface of the lower skin coaxially arranged with respect to the passing-through hole; and
      an inner elevated seat arranged above an inner surface of the carbon fiber lower skin and coaxially arranged with respect to the passing-through hole, wherein the thickness of the skin around the passing-through hole is maintained in correspondence with the conical cavity and elevated seat; and
   a valve comprising:
      a main body, wherein the main body is fitted into the passing-through hole;
      an outer head, wherein the outer head comprises a conical structure that fits into the conical cavity on the outer surface of the lower skin; and
      an inner nut coupled to the main body and making contact with the inner elevated seat.

2. The fastening system according to claim 1, wherein the inner elevated seat of the carbon fiber lower skin presents a conical structure.

3. The fastening system according to claim 2, wherein the conical structure of the inner elevated seat is complimentary to a conical surface incorporated into a lower face of the inner nut that makes contact with the inner elevated seat.

4. The fastening system according to claim 1, wherein the seat and the conical cavity are obtained by deformation of the carbon fiber lower skin.

5. The fastening system according to claim 1, wherein the seat and the conical cavity are obtained by taping strips of fabric of the carbon fiber over a conical piece to form the conical cavity in the carbon fiber lower skin.

* * * * *